US012683072B2

(12) United States Patent
Boettigheimer et al.

(10) Patent No.: US 12,683,072 B2
(45) Date of Patent: Jul. 14, 2026

(54) INDUCTION CHARGING DEVICE FOR A VEHICLE CHARGING SYSTEM

(71) Applicant: Mahle International GmbH, Stuttgart (DE)

(72) Inventors: Mike Boettigheimer, Stuttgart (DE); Tobias Fuchs, Boeblingen (DE); Christopher Laemmle, Stuttgart (DE); Timo Laemmle, Kernen (DE); Holger Schroth, Maulbronn (DE)

(73) Assignee: Mahle International GmbH (DE)

( * ) Notice: Subject to any disclaimer, the term of this patent is extended or adjusted under 35 U.S.C. 154(b) by 921 days.

(21) Appl. No.: 17/799,656

(22) PCT Filed: Feb. 10, 2021

(86) PCT No.: PCT/EP2021/053167
§ 371 (c)(1),
(2) Date: Aug. 12, 2022

(87) PCT Pub. No.: WO2021/160653
PCT Pub. Date: Aug. 19, 2021

(65) Prior Publication Data
US 2024/0194399 A1    Jun. 13, 2024

(30) Foreign Application Priority Data

Feb. 13, 2020    (DE) .......................... 102020201821.9

(51) Int. Cl.
*H01F 27/36*        (2006.01)
*B60L 53/12*        (2019.01)
(Continued)

(52) U.S. Cl.
CPC ............ *H01F 27/366* (2020.08); *B60L 53/12* (2019.02); *H01F 3/08* (2013.01); *H01F 27/263* (2013.01);
(Continued)

(58) Field of Classification Search
CPC .......... H01F 27/366; H01F 3/08; H01F 38/14; H01F 2003/106; B60L 53/12
(Continued)

(56) References Cited

U.S. PATENT DOCUMENTS 9,824,805 B2    11/2017    Wechlin
10,657,337 B2    5/2020    Yamamoto
(Continued)

FOREIGN PATENT DOCUMENTS

CN        103890877 A    6/2014
CN        108231381 A    6/2018
(Continued)

OTHER PUBLICATIONS

Preparation and characterization of Ni—Zn ferrite + polymer nanocomposites using mechanical milling method by P. Raju S. R. Murthy (Year: 2012).*
(Continued)

*Primary Examiner* — Julian D Huffman
*Assistant Examiner* — Nathan J Instone
(74) *Attorney, Agent, or Firm* — Fishman Stewart PLLC

(57)        ABSTRACT

An induction charging device is disclosed. The induction charging device includes at least one coil and at least two magnetic-flux guiding elements spaced apart from one another. At least one gap is disposed between the at least two magnetic-flux guiding elements. A filling assembly is at least partially arranged in the at least one gap. The filling assembly is at least partly magnetically conductive. The filling assembly includes a plurality of layers where at least one layer defines a magnetically conductive layer and at least one other layer defines a magnetically neutral layer. The at least one gap has a gap height, a gap width, and a gap length.
(Continued)

The filling assembly, in the at least one gap, is defined of different layers with respect to at least one of the gap height and the gap length.

20 Claims, 6 Drawing Sheets

(51) Int. Cl.
| | |
|---|---|
| *H01F 3/08* | (2006.01) |
| *H01F 3/10* | (2006.01) |
| *H01F 27/26* | (2006.01) |
| *H01F 38/14* | (2006.01) |

(52) U.S. Cl.
CPC ....... *H01F 38/14* (2013.01); *H01F 2003/106* (2013.01)

(58) Field of Classification Search
USPC ........................................................ 320/104
See application file for complete search history.

(56) References Cited

U.S. PATENT DOCUMENTS

| | | | |
|---|---|---|---|
| 11,396,239 | B2 | 7/2022 | Helm |
| 2014/0240076 | A1 | 8/2014 | Elias |
| 2015/0321566 | A1 | 11/2015 | Czainski |
| 2015/0332839 | A1 | 11/2015 | Stock |
| 2016/0180995 | A1 | 6/2016 | Park |
| 2017/0121840 | A1 | 5/2017 | Evans, V |
| 2019/0378650 | A1 | 12/2019 | Boys |
| 2020/0062137 | A1* | 2/2020 | Helm ...................... H01F 38/14 |

FOREIGN PATENT DOCUMENTS

| | | | |
|---|---|---|---|
| CN | 108511153 | A | 9/2018 |
| CN | 108780696 | A | 11/2018 |
| CN | 109256257 | A | 1/2019 |
| DE | 102012103315 | A1 | 10/2013 |
| DE | 102013226224 | A1 | 6/2014 |
| DE | 102016115809 | A1 | 6/2017 |
| DE | 102017211211 | A1 | 1/2019 |
| EP | 3576111 | A1 | 12/2019 |
| JP | 2015050261 | A | 3/2015 |
| JP | 2015088668 | A | 5/2015 |
| JP | 2019009298 | A | 1/2019 |
| JP | 2019165096 | A | 9/2019 |
| WO | 2013002433 | A1 | 1/2013 |
| WO | 2013056799 | A2 | 4/2013 |
| WO | 2017179562 | A1 | 10/2017 |
| WO | 2018057346 | A1 | 3/2018 |

OTHER PUBLICATIONS

English abstract for CN-109256257.
English abstract for CN-108231381.
German Search Report for DE-102020201821.9, dated Oct. 13, 2020.
Raju, P. Murthy, S. 2013 Preparation and Characterization.
English abstract for CN-108511153.
English abstract for DE-102016115809.
Chinese First Office Action dated Dec. 28, 2024 and Chinese Search Report dated Dec. 26, 2024 for Chinese Patent Application No. 2021800146957.
Notice of Reasons for Refusal dated Sep. 1, 2023 for Japanese Patent Application No. 2022-548138.

* cited by examiner

INDUCTION CHARGING DEVICE FOR A VEHICLE CHARGING SYSTEM

CROSS-REFERENCE TO RELATED APPLICATIONS

This application claims priority to International Patent Application No. PCT/EP2021/053167 filed Feb. 10, 2021, which also claims priority to German Patent Application No. DE 10 2020 201 821.9 filed Feb. 13, 2020, the contents of each of which is hereby incorporated by reference in their entirety.

TECHNICAL FIELD

The present invention relates to an induction charging device for a vehicle charging system and to a method for manufacturing an induction charging device of this type. The invention further relates to a vehicle charging system having an induction charging device of this type and to an assembly of magnetic-flux guiding elements for an induction charging device of this type.

BACKGROUND

In order to increase the acceptance of electrically driven vehicles with end users, it can be advantageous if the energy transmission between a stationary energy source and a traction battery unit of the vehicle takes place in a contactless or respectively wireless manner. A wireless energy transmission is advantageous for end users, because for example no charging cables have to be carried or respectively inserted. In addition, stationary induction charging stations can be partly buried in the ground region, so that a better integration into a cityscape or landscape is possible.

DE10 2016 115 809 A1 relates to an InFO package which is not suitable for a wireless charging and in particular not for an inductive energy transmission in a vehicle charging system.

CN 108511153 A relates to small charging coils for consumer electronics, which are produced in the flexible printed circuit (FPC) method. These charging coils are not suitable for an inductive energy transmission in a vehicle charging system.

US 2017/0121840 A1 relates to a method for manufacturing structures having concealed components for consumer electronics and is not suitable for an inductive energy transmission in a vehicle charging system.

US 2015/321566 A1 and DE 10 2012 103 315 A1 relate to devices for inductive energy transmission for electric vehicles.

Induction charging devices comprise magnetic-flux guiding elements for guiding the magnetic flux, in order to enable a reduction of transmission losses during the wireless energy transmission. A custom-fit mating of the magnetic-flux guiding elements on adjacent end faces would require a laborious and expensive surface grinding of all adjacent end faces. A dispensing of a custom-fit mating of the magnetic-flux guiding elements leads, on the other hand, to gaps between the magnetic-flux guiding elements, which have a reduced magnetic flux density.

The present invention is based on the problem of indicating, for a generic induction charging device, an improved or at least an alternative embodiment, which in particular is optimized with regard to the guiding of the magnetic flux in a gap between magnetic-flux guiding elements. The invention is further based on the problem of indicating an improved at least an alternative method for manufacturing an induction charging device, which in particular enables a simpler and more economical manufacture.

This problem is solved according to the invention by the subjects of the independent claim(s). Advantageous embodiments are the subject of the dependent claims.

SUMMARY

The present invention is based on the general idea of at least partly arranging a filling assembly in a gap between two spaced magnetic-flux guiding elements, which filling assembly is at least partly magnetically conductive.

The induction charging device for a vehicle charging system according to the invention comprises at least one coil for the generating or for the receiving of a magnetic alternating field. The coil can be configured as a spiral flat coil, in particular a circular or rectangular spiral flat coil, or as a double-D coil. The coil can be wound substantially around a coil winding axis.

The coil can be configured as a primary coil which generates a chronologically varying magnetic field, in order to enable a wireless energy transmission with the predetermined transmission power. For this, the primary coil can be supplied with the required electrical energy via a stationary energy source. The coil can be configured as a secondary coil, in which an electrical alternating voltage is induced, if the secondary coil is situated in the effective range of a chronologically varying magnetic field of a primary coil. When the secondary coil is situated in a closed electric circuit, the alternating voltage generates a current flow (alternating current), which can be used e.g. for charging a traction battery unit.

Provision can be made that the predetermined transmission power has a maximum transmission power of at least 10 kW. A maximum transmission power of at least 10 kW can be advantageous in particular for charging a traction battery unit of a vehicle, in order to minimize the required charging time. The predetermined transmission power can enable a power transmission which enables a charging of a traction battery unit of a vehicle in a time span which is predefined and/or is accepted by end users.

The induction charging device can form at least partly a stationary induction charging station. The induction charging device can form at least partly a mobile induction charging station.

The induction charging device further comprises at least two magnetic-flux guiding elements, spaced apart from one another, wherein a gap is formed between the two magnetic-flux guiding elements which are spaced apart from one another. "Gap" is to be understood as non microscopic gaps. "Gap" can be understood as a minimum gap.

The spaced magnetic-flux guiding elements may be formed and/or produced respectively separately by a primary shaping process. In other words, the spaced magnetic-flux guiding elements may not be formed by a separation of a magnetic-flux guiding element which is produced in one piece or respectively in one part.

A magnetic-flux guiding element has a higher magnetic permeability compared to air and can be formed at least partly of ferrimagnetic and/or ferromagnetic materials. The magnetic-flux guiding element can be formed as a plate element and/or as a sintered plate element. The induction charging device can have several magnetic-flux guiding elements, in particular several magnetic-flux guiding elements spaced apart from one another. Provision can be made that all magnetic-flux guiding elements are arranged spaced apart from one another and respectively at least one gap forms between adjacent magnetic flux guiding elements. A magnetic-flux guiding element can be formed from a soft magnetic material, in particular from a soft magnetic ferrite. A magnetic-flux guiding element can be formed as a ferrite body, in particular as a ferrite plate or ferrite tile.

The at least one gap can have a gap height and a gap width. The gap height can be formed along a direction parallel to the coil winding axis. The gap width can be formed along a direction transversely and/or perpendicularly to the coil winding axis. The gap width can be established with a distance along a direction transversely and/or perpendicularly to the coil winding axis between a gap face of a magnetic-flux guiding element and a gap face, spaced apart by the gap, of a further magnetic-flux guiding element. A gap face of a magnetic-flux guiding element can be aligned parallel to the coil winding axis. The gap height can correspond to a thickness of a magnetic-flux guiding element with respect to the coil winding axis. The gap height can correspond to the distance between a transverse face of a magnetic-flux guiding element, facing away from the coil, and a transverse face of a magnetic-flux guiding element, facing the coil, with respect to the coil winding axis. The transverse face, facing away from the coil, can be aligned transversely and/or perpendicularly to the coil winding axis. The transverse face, facing the coil, can be aligned transversely and/or perpendicularly to the coil winding axis. The gap width of a gap and/or of a minimum gap can lie in the range of 1 mm to 2 mm and offers an optimum in the tension ratio between manufacturing effort or respectively manufacturing tolerances which are to be maintained and gap volume minimizing.

The transverse faces, facing away from the coil, of several or all magnetic-flux guiding elements can lie and/or be aligned substantially in a shared plane facing away from the coil. The transverse faces, facing the coil, of several or all magnetic-flux guiding elements can lie and/or be aligned substantially in a shared plane facing the coil. The shared plane facing away from the coil and the shared plane facing the coil can be arranged spaced apart from one another with respect to the coil winding axis. The shared plane facing away from the coil and the shared plane facing the coil can be aligned parallel to one another.

Several or all magnetic-flux guiding elements can have an identical thickness. Several or all magnetic-flux guiding elements can be configured in a similar manner. The magnetic-flux guiding elements can be spaced apart from one another in circumferential direction around the coil winding axis and/or circumferentially around the coil winding axis. The magnetic flux guiding elements can be spaced apart from one another with respect to the coil winding axis. Several or all magnetic-flux guiding elements can be formed separately from one another. Several or all magnetic-flux guiding elements can be formed separately with respect to a housing, in particular separately with respect to a protective housing or with respect to a shielding housing, and/or with respect to the coil.

In the gap, a filling assembly is at least partly arranged, wherein the filling assembly is at least partly magnetically conductive. The gap can be entirely filled by a filling assembly. The filling assembly can be entirely magnetically conductive.

A portion of the filling assembly is deemed here and in the following as being magnetically conductive when this portion of the filling assembly has a relative magnetic permeability which is greater than 1.1 and/or preferably at least 1.5 and/or preferably at least 10.

A portion of the filling assembly is deemed here and in the following as being magnetically neutral when this portion of the filling assembly has a relative magnetic permeability in the range of 0.9 to 1.1, in particular of 1.

Provision can be made that at least a portion of the filling assembly has a relative magnetic permeability of at least 50, in particular of at least 100.

Through the filling assembly, an optimized and, if applicable, complex magnetic flux guiding, with respect to the energy transmission, can be provided within at least one gap between two spaced magnetic-flux guiding elements.

Provision can be made that each gap between spaced and adjacent magnetic-flux guiding elements is filled at least partly or entirely by a filling assembly of this type. Provision can be made that the configuration of the filling assembly is formed substantially similarly for several gaps or all gaps.

In an advantageous further development of the solution according to the invention, provision is made that the filling assembly has magnetic-flux guiding particles. The filling assembly can have a plurality of magnetic-flux guiding particles which are formed separately from one another.

The magnetic-flux guiding particles can be at least partly magnetic conductive. The magnetic-flux guiding particles can have a relative magnetic permeability of at least 50, in particular of at least 100. The magnetic-flux guiding particles can be formed at least partly of ferrimagnetic materials and/or ferromagnetic materials and/or soft magnetic materials and/or soft magnetic ferrite. The magnetic-flux guiding particles can be present, before an introduction into the gap, as a pourable and/or as a free-flowing granulate and/or as a loose granulate and/or as a loose powder. The magnetic-flux guiding particles can be formed as fine particles, which have for example smaller dimensions compared to the thickness of the magnetic-flux guiding elements.

The magnetic characteristics of the filling assembly can be adapted through the quantity and/or through the number and/or the position of the magnetic-flux guiding particles.

The magnetic-flux guiding particles can have respectively a spherical shape. Here, the magnetic-flux guiding particles can respectively have a diameter of 20 μm to 500 μm, in particular 150 μm. Hereby, an optimized gap filling or respectively an optimized reduction of the residual air content can be achieved in the gap.

The size distribution and particle shape does not have to be uniform, but rather can correspond to a continuous grading curve. Thereby, a maximum volume filling or respectively a minimum pore volume can be achieved. The size distribution, in particular continuous or respectively constant size distribution, of the diameter of the magnetic-flux guiding particles can lie in the range of 20 μm to 500 μm. The size distribution of the diameter of the magnetic-flux guiding particles can be selected so that a maximum volume filling or respectively a minimum pore volume or respectively a minimum residual air quantity are achieved.

In an advantageous further development of the solution according to the invention, provision is made that at least a portion of the magnetic-flux guiding particles form respectively a particle shape deviating from a spherical shape, and/or that at least a portion of the magnetic-flux guiding particles respectively form a particle shape in the form of a spheroid, and/or that at least a portion of the magnetic-flux guiding particles form respectively a particle shape in the form of a triaxial ellipsoid, and/or that at least a portion of the magnetic-flux guiding particles form respectively a flat, in particular lenticular or plate-like particle shape.

All magnetic-flux guiding particles and/or a majority of the magnetic-flux guiding particles, in particular 80% of the magnetic-flux guiding particles in relation to the total number of magnetic-flux guiding particles in the gap, can respectively form a particle shape deviating from a spherical shape and/or a particle shape in the form of a spheroid and/or a particle shape in the form of a triaxial ellipsoid and/or a flat, in particular lenticular or plate-like, particle shape.

In the case of a particle shape deviating from a spherical shape, the maximum dimensions of the magnetic-flux guiding particle can be configured so that the magnetic-flux guiding particle can be surrounded and/or enclosed by a notional sphere, wherein the notional sphere has a diameter of 20 μm to 500 μm, in particular 150 μm. Hereby, an optimized gap filling or respectively an optimized reduction of the residual air content in the gap can be achieved.

Also in the case of a particle shape deviating from a spherical shape, the size distribution and particle shape does not have to be uniform, but rather can correspond to a continuous grading curve. Thereby, a maximum volume filling or respectively a minimum pore volume can be achieved. The size distribution, in particular continuous or respectively constant size distribution, of the magnetic-flux guiding particles can be established in the case of a particle shape deviating from a spherical shape through the diameter of the notional surrounding sphere, wherein this diameter lies in the range of 20 μm to 500 μm. The size distribution of the diameter of the notional surrounding sphere can be selected so that a maximum volume filling or respectively a minimum pore volume or respectively a minimum residual air quantity can be achieved.

The outer surface of a spheroid can be defined by a notional rotation of an ellipse about one of its axes. Here, the ellipse has a large half-axis and a small half-axis, wherein the notional rotation of the ellipse takes place about the small half-axis. For the case where the magnetic-flux guiding particles have at least partly a particle shape in the form of a spheroid, the ratio of large half-axis to small half-axis can be greater than 1 and less than or equal to 3. Hereby, optimized gap filling or respectively optimized reduction of the residual air content in the gap can be achieved.

The outer surface of a flat, in particular lenticular or plate-like, particle shape can also be defined by a notional rotation of an ellipse about one of its axes. Here, the ellipse has a large half-axis and a small half-axis, wherein the notional rotation of the ellipse takes place about the small half-axis. For the case where the magnetic-flux guiding particles have at least partly a flat, in particular lenticular or plate-like particle shape, the ratio of large half-axis to the small half-axis can be greater than 3 and less than or equal to 10.

In the case of a particle shape in the form of a spheroid and/or in the form of a flat, in particular lenticular or plate-like, particle shape, the small half-axes of the magnetic-flux guiding particles in the gap can be aligned so that the small half-axes are aligned parallel to the coil winding axis.

These magnetic-flux guiding particles can be aligned in the gap so that they have a smaller extent along a direction parallel to the coil winding axis compared to an extent along a direction transversely and/or perpendicularly to the coil winding axis. Hereby, a naturally aligned layer structure on introducing of the magnetic-flux guiding particles can be achieved by trickling, pouring or similar, or respectively in the injection method of filled matrix materials or settlement behaviour in low-viscosity suspensions. Furthermore, such magnetic-flux guiding particles can be used, in order to form an anisotropic magnetic permeability in the gap, in which the magnetic permeability of the filling assembly along a direction parallel to the coil winding axis is smaller than the magnetic permeability of the filling assembly along a direction transversely and/or perpendicularly to the coil winding axis.

These magnetic-flux guiding particles can bring about a reduction of the magnetic field scattering from the magnetic-flux guiding elements plane and/or a reduction of eddy current losses in for example adjacent metallic components.

In an advantageous further development of the solution according to the invention, provision is made that at least a portion of the magnetic-flux guiding particles is introduced as a fill into the gap, and/or that at least a portion of the magnetic-flux guiding particles is introduced as a loose fill into the gap, and/or that at least a portion of the magnetic-flux guiding particles is introduced as a compressed fill into the gap.

The magnetic characteristics of a fill can be adapted through the quantity and/or through the number of the magnetic-flux guiding particles and a corresponding pressurisation and/or compression and/or compaction. A fill, in particular a loose fill and/or a compressed fill, can be introduced into the gap for example with a positional securing of the magnetic-flux guiding elements by trickling and/or shaking and/or blowing and/or blowing-in of magnetic-flux guiding particles into the gap.

A loose fill can partly have air, therefore e.g. can form a mixture of magnetic-flux guiding particles and air. A loose fill can have a higher air content compared to a compressed fill. A compressed fill can be formed so that in the volume in which the compressed fill is arranged, no air inclusion or a reduced air inclusion is formed.

Loose fills of magnetic-flux guiding particles, which are introduced into gaps of unknown contour, can be compressed by hydraulic or pneumatic pressure. For this, the structure of magnetic-flux guiding elements, in particular ferrite tiles, and of the filling assembly can be positioned between two rubber bellows, in which the pressure necessary for the compressing can be set. The elastic rubber material adapts to the gap contour and compresses the loose fill in the gap to a compressed fill. The filling height of the fill in the gap can be reduced here. Such a method can also be applied in the case of a fill which is surrounded by paper.

Fills, in particular compressed fills, of magnetic-flux guiding particles can be formed by methods of the shaping of ferrite powder, which are also used in the production (shaping) of green bodies in a sinter process.

For the compressing of magnetic-flux guiding particles in the gap, a pressure in the pressure range of 1 MPa (e.g. loose compressing) up to 100 MPa (e.g. an independent green body which is readily able to be handled) can be used. Preferably, for the compressing of magnetic-flux guiding particles in the gap a pressure in the pressure range of 10 to 20 MPa can be used, which is able to be managed easily and economically with regard to manufacturing technique and technologically.

In an advantageous further development of the solution according to the invention, provision is made that a fill, in particular a loose fill and/or a compressed fill, is arranged with a separate positional securing in the gap, wherein the separate positional securing is arranged in the gap free of material connection with respect to the magnetic-flux guiding elements forming the gap, and/or that a fill, in particular a loose fill and/or a compressed fill, is arranged with an integral positional securing in the gap, wherein the integral positional securing is connected at least partly in a materially connected manner with the magnetic-flux guiding elements forming the gap.

The separate positional securing can be displaceable with respect to the magnetic-flux guiding elements forming the gap. Such a separate positional securing can for example remain arranged permanently in the gap or can be arranged in an only chronologically limited manner for the filling-in of the fill in the gap.

The separate positional securing can be formed from a magnetically neutral material.

An integral positional securing can be formed partly by the fill which is to be secured, in particular by the loose fill which is to be secured and/or the compressed fill which is to be secured, itself. Alternatively of additionally, the integral positional securing can be formed by a portion of the filling assembly, which does not correspond to the fill which is to be secured, in particular not to the loose fill and/or the compressed fill.

The integral positional securing can be formed from a magnetically neutral material. The integral positional securing can form a materially connected connection of the gap-forming magnetic-flux guiding elements.

In an advantageous further development of the solution according to the invention, provision is made that the separate positional securing has a casing body, in particular a casing body of paper material, for the complete casing of the magnetic-flux guiding particles of the fill, in particular of the loose fill and/or of the compressed fill, wherein the casing body, in particular the casing body of paper material, together with the magnetic-flux guiding particles of the fill, in particular of the loose fill and/or of the compressed fill, forms a package.

The fill, in particular a loose fill, in the package can be compressed to form a compressed fill before an inserting of the package into the gap. The fill, in particular a loose fill, in the package can be compressed after the inserting of the package into the gap to form a compressed fill.

A spilling of the magnetic-flux guiding particles of the fill can be prevented by the casing body. The casing body can be formed for example from paper material and/or can form a paper casing. The casing body and/or the paper material can be a temperature-stabilized durable paper type. The casing body can be magnetically neutral.

A fill, in particular a loose fill and/or a compressed fill, of magnetic-flux guiding particles for positional securing can thus be packed into slim packages, encased by paper, which can be pressed easily into the gaps. These packages can form semi-finished products for the easier production of the induction charging device.

In an advantageous further development of the solution according to the invention, provision is made that a fill, in particular a loose fill and/or a compressed fill, which is arranged with an integral positional securing in the gap, forms a porous solid body layer, wherein the porous solid body layer is formed by magnetic-flux guiding particles which have a surface coating for materially connected connection with one another and for the at least partial materially connected connection with the gap-forming magnetic-flux guiding elements.

Provision can be made that several layers or all layers of the filling assembly are formed as a porous solid body layer. Several porous solid body layers or all porous solid body layers can be arranged lying on one another and/or stacked with respect to the coil winding axis.

The magnetic-flux guiding particles with surface coating can be present as a pourable and/or as a free-flowing granulate and/or as a loose granulate and/or as a loose powder before an introduction into the gap. The magnetic-flux guiding particles with surface coating can be formed as fine particles, which for example have smaller dimensions compared to the thickness of the magnetic-flux guiding elements.

The magnetic-flux guiding particles with surface coating can have a magnetic-flux guiding particle core, which is formed at least partly of ferrimagnetic materials and/or ferromagnetic materials and/or soft magnetic materials and/or soft magnetic ferrite.

The surface coating of the magnetic-flux guiding particles can be thin compared to the dimensions of the magnetic-flux guiding particles. The surface coating can be formed for example of a meltable material, in particular a thermoplastic. The surface coating can be magnetically neutral.

The surface coating can be a material with good thermal conductivity properties. The surface coating can have a thermal conductivity and/or a thermal conductivity coefficient of at least 0.5 W/(m·K), in particular of at least 1.0 W/(m·K) or in particular of at least 10.0 W/(m·K). Hereby, for example, the thermal conductivity improves through the structure up to an externally arranged heat sink.

The magnetic flux guiding particles with surface coating can be introduced into the gap for example by a nozzle and/or by an injection- or pressing process, wherein the surface coating firstly melts and subsequently solidifies, so that a porous solid body layer is formed.

The porous solid body layer can form a materially connected mechanical connection between a gap face of a magnetic-flux guiding element and a gap face, spaced by the gap, of an adjacent magnetic-flux guiding element. Hereby, the mechanical stability and/or strength of the overall structure can be improved.

In an advantageous further development of the solution according to the invention, provision is made that the filling assembly has at least one embedding matrix for the embedding of magnetic-flux guiding particles, and/or that at least a portion of the magnetic-flux guiding particles as filler is introduced in at least one embedding matrix of the filling assembly.

The embedding matrix can be formed of an embedding material for the embedding of magnetic-flux guiding particles. The embedding matrix can be formed of a magnetically neutral embedding material. The embedding matrix can be formed of an embedding material having good thermal conductivity properties. The embedding matrix can have a thermal conductivity and/or a thermal conductivity coefficient of at least 0.5 W/(m·K), in particular of at least 1.0 W/(m·K) or in particular of at least 10.0 W/(m·K). Hereby, for example the thermal conductivity improves through the structure up to an externally arranged heat sink.

The embedding matrix can form a materially connected mechanical connection between a gap face of a magnetic-flux guiding element and a gap face, spaced by the gap, of an adjacent magnetic-flux guiding element. Hereby, the mechanical stability and/or strength of the overall structure can be improved.

The magnetic characteristics of the filling assembly can be adapted through the quantity and/or through the number of the magnetic-flux guiding particles in the embedding matrix.

In an advantageous further development of the solution according to the invention, provision is made that the embedding matrix with embedded magnetic-flux guiding particles is introduced in pasty form into the gap, or that the embedding matrix with embedded magnetic-flux guiding particles is introduced in pasty form into the gap, wherein the embedding matrix is formed of an actively hardenable matrix material, in particular an adhesive material, or that the embedding matrix with embedded magnetic-flux guiding particles is introduced in pasty form into the gap, wherein the embedding matrix is formed of a passively hardenable matrix material, in particular a thermoplastic material and or duroplast material and/or elastomers and/or hydraulically setting material.

The embedding matrix with embedded magnetic-flux guiding particles can be introduced into the gap through dispensing and/or encapsulating and/or extrusion.

The embedding matrix with embedded magnetic-flux guiding particles can form a materially connected mechanical connection between a gap face of a magnetic-flux guiding element and a gap face, spaced by the gap, of an adjacent magnetic-flux guiding element. Hereby, the mechanical stability and/or strength of the overall structure can be improved.

The embedding matrix with embedded magnetic-flux guiding particles in pasty form can be introduced into the gap by injection moulding as an injection moulded layer.

In an advantageous further development of the solution according to the invention, provision is made that the embedding matrix with embedded magnetic-flux guiding particles forms a foil element, wherein at least one such foil element is introduced in the gap.

The embedding matrix of the foil element can be for example an adhesive matrix and/or a polymer matrix and/or a thermoplastic matrix and/or a duroplast matrix and/or elastomer and/or hydraulically setting materials, which hardens before the introducing of the foil element into the gap.

The foil element can thus be formed as a hardened solid body layer before an introducing into the gap. Hereby, the foil layer can be provided as a semi-finished product, which can be used easily and economically in the manufacturing process of the induction charging device. The predefined foil thickness can be smaller than the gap height of the gap and/or smaller than the gap width of the gap. Through the predefined foil thickness, an adaptation to the gap height of the gap and/or to the gap width of the gap can take place through the number of foil elements. If, for example, in different embodiments of the induction charging device, different gap heights and/or gap widths are predetermined, the adaptation can take place easily through an increase or reduction of the number of the foil elements.

Several foil elements can be arranged in the gap, which can be arranged lying and/or stacked with respect to the coil winding axis. Several foil elements can be arranged in the gap, which can be arranged adjacent to one another and/or stacked transversely and/or perpendicularly to the coil winding axis.

In an advantageous further development of the solution according to the invention, provision is made that the filling assembly has several layers.

The gap can be filled entirely by a filling assembly having several layers. At least two layers or all layers can be formed of different material layers. At least two layers or all layers can be formed of different solid body layers. At least two layers or all layers can have different magnetic characteristics. At least two layers or all layers can have in particular a different magnetic permeability and/or magnetic conductivity. At least two layers or all layers can be formed of similar material layers which have different magnetic characteristics and/or a different magnetic permeability and/or a different magnetic conductivity.

The magnetic characteristics and/or the magnetic permeability and/or the magnetic conductivity of the layers can vary with respect to the coil winding axis. The magnetic characteristics and/or the magnetic permeability and/or the magnetic conductivity of the layers can increase with respect to the coil winding axis with an increasing distance from the coil in sections respectively and/or can be substantially constant in sections and/or can decrease in sections.

Provision can be made that at least one layer of the filling assembly and/or several layers of the filling assembly has a relative magnetic permeability of at least 50, in particular of at least 100.

Provision can be made that at least one layer of the filling assembly and/or several layers of the filling assembly are magnetically neutral.

Through the multi-layered structure of the filling assembly, different primary functions can be assigned to the layers within the gap. Provision can thus be made for example that the primary function of a layer is magnetic-flux guiding within the gap, while the primary function of a further layer is the formation of a mechanically resistant filling assembly.

Provision can be made that each gap between spaced and adjacent magnetic-flux guiding elements is entirely filled by such a filling assembly with several layers. Provision can be made that the multi-layered structure of the filling assembly is formed substantially similarly for several gaps or all gaps.

With differently aligned gaps, it can be advantageous to adapt the structure of the layers of the filling assembly and/or to adapt the filling material to the magnetic flux to be expected in this gap. Gaps which are aligned orthogonally to the magnetic flux direction, can be filled for example with material of high magnetic quality or respectively of high relative magnetic permeability. With gaps running parallel to the magnetic flux direction, for example other characteristics (e.g. thermal and/or mechanical characteristics can be prioritized.

At least one layer of the filling assembly or several layers of the filling assembly or all layers of the filling assembly can be connected in a materially connected manner with the two magnetic-flux guiding elements which are spaced apart from one another by the gap.

Provision can be made that several layers or all layers of the filling assembly are formed as an adhesive layer. Several adhesive layers or all adhesive layers can be arranged lying on one another and/or stacked with respect to the coil winding axis.

Provision can be made that several layers or all layers of the filling assembly are formed as an injection-moulded layer. Several injection-moulded layers or all injection-moulded layers can be arranged lying on one another and/or stacked with respect to the coil winding axis.

An adhesive layer and/or an injection-moulded layer, which can be introduced into gaps of unknown contour, can be compressed for example after introducing into the gap, by hydraulic or pneumatic pressure. For this, the structure of magnetic-flux guiding elements, in particular ferrite tiles, and the filling assembly can be positioned between two rubber bellows, in which the pressure required for the compression can be set. The elastic rubber material adapts to the gap contour and compresses the adhesive layer and/or the injection-moulded layer in the gap. The filling height of the layer in the gap can reduce here.

Provision can be made that at least one layer of the filling assembly is formed as a semi-finished product inserted into the gap, and/or that the filling assembly is formed as a semi-finished product inserted into the gap.

Provision can be made that at least two layers of the filling assembly have different magnetic characteristics.

At least two layers or all layers can have in particular a different magnetic permeability and/or magnetic conductivity. At least two layers or all layers can be formed of similar material layers which have different magnetic characteristics and/or a different magnetic permeability and/or a different magnetic conductivity.

In an advantageous further development of the solution according to the invention, provision is made that at least one layer of the filling assembly forms a magnetically conductive layer, and/or that at least one layer of the filling assembly forms a magnetically neutral layer.

Provision can be made that the at least one magnetically conductive layer of the filling assembly has a relative magnetic permeability of at least 50, in particular of at least 100.

The at least one magnetically conductive layer can have magnetic-flux guiding particles. Provision can be made that at least a portion of these magnetic-flux guiding particles form respectively a particle shape deviating from a spherical shape, and/or that at least a portion of these magnetic-flux guiding particles form respectively a particle shape in the form of a spheroid, and/or that at least a portion of these magnetic-flux guiding particles respectively form a particle shape in the form of a triaxial ellipsoid, and/or that at least a portion of the magnetic-flux guiding particles respectively form a flat, in particular lenticular or plate-like particle shape.

The at least one magnetically conductive layer can be formed by a fill of magnetic-flux guiding particles, in particular by a loose fill of magnetic-flux guiding particles or a compressed fill of magnetic-flux guiding particles.

The at least one magnetically conductive layer can be configured so that a separate positional securing has a casing body, in particular a casing body of paper material for the complete casing of magnetic-flux guiding particles of the fill, in particular of the loose fill and/or of the compressed fill, wherein the casing body, in particular the casing body of paper material, together with the magnetic-flux guiding particles of the fill, in particular the loose fill and/or the compressed fill, forms a package.

Such packages, which can be introduced into gaps of unknown contour, can be compressed for example, after an introducing into the gap, by hydraulic or pneumatic pressure. For this, the structure of magnetic-flux guiding elements, in particular ferrite tiles, and of the filling assembly can be positioned between two rubber bellows, in which the pressure required for the compression can be set. The elastic rubber material adapts to the gap contour and compresses the granulate package in the gap. The filling height of the granulate package in the gap can reduce here.

Fills, in particular compressed fills, of magnetic-flux guiding particles can be formed by methods of shaping of ferrite powder, which are also used in the production (shaping) of green bodies in a sinter process.

For the compression of magnetic-flux guiding particles in the gap, a pressure can be used in the pressure range of 1 MPa (e.g. loose compression) to 100 MPa (e.g. an independent green body which is readily able to be handled). Preferably, for the compression of magnetic-flux guiding particles in the gap a pressure can be used in the pressure range of 10 to 20 MPa, which is able to be managed easily and economically with regard to manufacturing technique and technologically.

The at least one magnetically conductive layer can be configured so that a fill, in particular a loose fill and/or a compressed fill, which is arranged with an integral positional securing in the gap, forms a porous solid body layer, wherein the porous solid body layer is formed by magnetic-flux guiding particles which have a surface coating for the materially connected connection with one another and for the at least partial materially connected connection with the gap-forming magnetic-flux guiding elements.

The at least one magnetically conductive layer can have at least one embedding matrix for the embedding of magnetic-flux guiding particles and/or can be configured so that at least a portion of the magnetic-flux guiding particles is introduced as filler in at least one embedding matrix of the magnetically conductive layer.

The at least one magnetically conductive layer can be configured so that the embedding matrix with embedded magnetic-flux guiding particles is introduced in pasty form into the gap, or that the embedding matrix with embedded magnetic-flux guiding particles is introduced in pasty form into the gap, wherein the embedding matrix is formed of an actively hardenable matrix material, in particular an adhesive material, or that the embedding matrix with embedded magnetic-flux guiding particles is introduced in pasty form into the gap, wherein the embedding matrix is formed of a passively hardenable matrix material, in particular a thermoplastic material and/or duroplast material and/or elastomers and/or hydraulically setting materials.

The at least one magnetically conductive layer can be formed so that the embedding matrix with embedded magnetic-flux guiding particles forms a foil element, wherein at least one such foil element is introduced in the gap.

Through a magnetically conductive layer, the magnetic flux can be concentrated in this layer on transition between two magnetic-flux elements spaced by the gap.

The at least one magnetically neutral layer of the filling assembly can be formed by a magnetically neutral casting compound.

The at least one magnetically neutral layer of the filling assembly can form an air layer and/or a magnetically neutral solid body layer.

The at least one magnetically neutral layer of the filling assembly can be a foil element, in particular a foil element without magnetic-flux guiding particles.

The at least one magnetically neutral layer of the filling assembly can be an adhesive layer, in particular an adhesive layer without magnetic-flux guiding particles.

The at least one magnetically neutral layer of the filling assembly can be an injection-moulded layer, in particular an injection-moulded layer without magnetic-flux guiding particles.

The magnetically neutral layer of the filling assembly can be a material having good thermal conductivity properties. The magnetically neutral layer of the filling assembly can have a thermal conductivity and/or a thermal conductivity coefficient of at least 0.5 W/(m·K), in particular of at least 1.0 W/(m·K) or in particular of at least 10.0 W/(m·K). Hereby, for example the thermal conductivity improves through the structure up to an externally arranged heat sink.

In an advantageous further development of the solution according to the invention, provision is made that at least one magnetically conductive layer of the filling assembly is arranged between two magnetically neutral layers of the filling assembly, and/or that a magnetically conductive layer of the filling assembly is arranged touching on at least one magnetically neutral layer of the filling assembly.

At least one magnetically conductive layer of the filling assembly can be arranged with respect to the coil winding axis between two magnetically neutral layers, in particular between two magnetically neutral outer layers, of the filling assembly.

In an advantageous further development of the solution according to the invention, provision is made that at least one magnetically neutral layer of the filling assembly is an air layer, and/or that at least one magnetically neutral layer of the filling assembly forms through a magnetically neutral solid body layer, and/or that at least one magnetically neutral solid body layer of the filling assembly forms a magnetically neutral outer layer, which is partly formed within the gap and partly outside the gap.

In an advantageous further development of the solution according to the invention, provision is made that the outer layer is formed as a cast body, into which the coil is embedded. The cast body can be formed from a casting compound. The cast body and/or the casting compound can form a magnetically neutral solid body layer.

Through the use of an air layer and/or of a magnetically neutral solid body layer, it is possible for example to induce a targeted scatter of the magnetic field in the housing interior, in order to reduce an occurrence of eddy currents and/or eddy current losses in adjacent components.

The air layer and/or the magnetically neutral solid body layer can nominally scarcely transmit the magnetic flux, however a scatter of the magnetic field takes place in this region, so that the magnetic field is distinctly weakened outside the limits of the magnetic-flux guiding elements. In particular, hereby the magnetic field can be reduced on the side of the magnetic-flux guiding elements facing away from the coil. Hereby, eddy current losses can be minimized in a housing and in other electrical conductors in the effective range of the magnetic field.

In an advantageous further development of the solution according to the invention, provision is made that at least two gaps are formed, spaced apart from one another, in which respectively a filling assembly with at least one magnetically neutral layer is arranged, wherein the magnetically neutral layers are connected to one another.

The neutral layers, connected to one another, of the at least two gaps, spaced apart from one another, can be connected directly to one another. The neutral layers, connected to one another, can form an outer layer.

Provision can be made that a form fit, in particular a form fit through the outer layer between the gap-forming magnetic-flux guiding elements, is formed, in order to form the magnetic-flux guiding elements, spaced by the gap, to a stable one-piece magnetic-flux guiding arrangement with gap filling and/or formed-on spacers.

For a form fit, at least one outer layer of the filling assembly can contact and/or touch coil-facing transverse faces of both magnetic-flux guiding elements, spaced by the gap, and/or transverse faces, facing away from the coil, of both magnetic-flux guiding elements, spaced by the gap, and/or can be connected to these in a materially connected manner.

Provision can be made that a form fit, in particular a form fit through the outer layer between the magnetic-flux guiding elements, is formed, in order to form an assembly which is able to be mounted in one piece.

In an advantageous further development of the solution according to the invention, provision is made that at least one layer of the filling assembly has magnetic-flux guiding particles, and/or that at least one layer of the filling assembly has magnetic-flux guiding particles, wherein within this layer, the concentration of the magnetic-flux guiding particles varies spatially, and/or that at least two layers of the filling assembly have respectively magnetic-flux guiding particles, wherein the concentration of the magnetic-flux guiding particles in the two layers is different.

Provision can be made, for example, that the filling assembly is formed in that firstly a magnetically neutral casting compound with a small content of magnetic-flux guiding particles is introduced, wherein the casting compound, on introduction into the gap, has such a low viscosity that the magnetic-flux guiding particles, due to gravity, accumulate or respectively concentrate in a layer region of the filling assembly such that a filling assembly is formed which forms graded magnetic characteristics with respect to the coil winding axis. Hereby, the magnetic characteristics of the filling assembly can be adapted in a required manner with respect to the coil winding axis and/or with respect to the gap height. This process can be accelerated by a vibrator and/or by a vibrating device. Provision can be made that after this process, the filling assembly forms at least one magnetically neutral layer, which in particular is substantially free of magnetic-flux guiding particles, and forms a further layer, in which magnetic-flux guiding particles are introduced. The layer with the magnetic-flux guiding particles can be arranged with respect to the coil winding axis nearer to the coil than the magnetically neutral layer. The magnetically neutral layer can be a magnetically neutral solid body layer.

In an advantageous further development of the solution according to the invention, provision is made that at least one magnetically neutral solid body layer, in particular a magnetically neutral outer layer, of the filling assembly is formed by a magnetically neutral casting compound, and/or that a magnetically neutral outer layer is formed for the distancing and/or for the connecting and/or for the fixing and/or for the positioning of components of the induction charging device, and/or the magnetic-flux guiding elements, spaced apart from one another, together with the filling assembly form in the gap an assembly which is able to be mounted in one piece.

The outer layer can be formed outside the gap for the distancing and/or for the connecting and/or for the fixing and/or for the positioning of components of the induction charging device.

The outer layer can be formed for the distancing and/or for the connecting and/or for the fixing and/or for the positioning of a protective housing. The outer layer can be formed for the distancing and/or for the connecting and/or for the fixing and/or for the positioning of a shielding housing. The outer layer can be formed for the distancing and/or for the connecting and/or for the fixing and/or for the positioning of the coil. The outer layer can be formed for the distancing and/or for the connecting and/or for the fixing and/or for the positioning of the magnetic-flux guiding elements, spaced apart by the gap.

A connection can form a materially connected connection. The outer layer can form, for distancing, distancing elements, in particular distancing elements formed outside the gap.

The outer layer can be formed as a magnetically neutral solid body layer. Such an outer layer can be hardened (e.g. thermally) in a process step together with at least one further layer, which has magnetic-flux guiding particles.

The outer layer can be used outside the gap for connection functions for the wire or respectively coil and/or components of a power electronics and/or of the electromagnetic shield. In addition, a materially connected mechanical connection can provide an additional stability and strength of the overall structure through the filling assembly between a gap face of a magnetic-flux guiding element and a gap face, spaced by the gap, of an adjacent magnetic-flux guiding element.

Provision can be made that a form fit, in particular a form fit through the outer layer between the magnetic-flux guiding elements, is formed, in order to form the magnetic-flux guiding elements, spaced by the gap, to a stable, one-piece magnetic-flux guiding arrangement with gap filling and formed-on spacers.

For a form fit, at least one outer layer of the filling assembly can contact and/or touch coil-facing transverse faces of both magnetic-flux guiding elements, spaced by the gap, and/or transverse faces, facing away from the coil, of both magnetic-flux guiding elements, spaced by the gap, and/or be connected to these in a materially connected manner.

In an advantageous further development of the solution according to the invention, provision is made that the induction charging device has a housing which forms a housing interior, wherein the coil and the magnetic-flux guiding elements are arranged in the housing interior.

The housing can be a casting compound housing, which is formed in one piece through a casting compound, filling the housing interior and enclosing the components of the induction charging device.

The housing can be formed with at least two parts, wherein such a two-part housing can have a protective housing for protection from external influences, and a shielding housing, formed separately from the protective housing, for the shielding of electromagnetic alternating fields.

The protective housing can form a trough-shaped protective housing.

The protective housing can be formed from an electrically non-conductive material. The protective housing can be formed from a plastic material and/or from a composite material and/or from a fibre-reinforced composite material.

The shielding housing can form a shielding body for electromagnetic shielding. The shielding body can be formed for example for the shielding of vehicle components with respect to electromagnetic fields. The shielding housing can form and/or have a shielding plate of a metallic material. The metallic material can be, for example, aluminium. The shielding housing can be formed as a flat body and/or plate-shaped body.

The shielding housing and the protective housing can form the housing interior and delimit the latter with respect to an external environment, in particular delimit it in a fluid-tight manner.

The magnetic-flux guiding elements can be arranged spaced apart in the housing interior with respect to the shielding housing and/or spaced apart with respect to the protective housing and/or spaced apart with respect to the coil. The coil can be arranged with respect to the coil winding axis between the magnetic-flux guiding elements and the protective housing. The coil can be arranged here with respect to the coil winding axis spaced apart from the magnetic-flux guiding elements and from the protective housing. Free spaces between spaced components can be filled partly and/or entirely in the housing interior for example by at least one casting compound, in particular a thermally conductive casting compound.

In an advantageous further development of the solution according to the invention, provision is made that the induction charging device has more than two magnetic-flux guiding elements, spaced apart from one another, wherein several gaps are formed between the magnetic-flux guiding elements which are spaced apart from one another, wherein only in a portion of the gaps respectively at least partly a filling assembly is arranged. In other words, the induction charging device has a plurality of gaps between a plurality of magnetic-flux guiding elements, wherein only some, therefore not all, gaps have a filling assembly.

In an advantageous further development of the solution according to the invention, provision is made that each gap has respectively a gap height, a gap width and a gap length, wherein the filling assembly arranged in at least one gap is formed of different layers with respect to the gap height and/or with respect to the gap length. The different layers can be formed as different material layers.

In other words, the filling assembly arranged in a gap, in thickness direction of the magnetic-flux guiding elements, can be built up in layers of different material and/or in longitudinal direction of the gap can have a variable layer structure.

The term "with respect to the gap height" can be understood to mean an arrangement with respect to a gap height direction, which is parallel to the coil winding axis. The term "with respect to the gap length" can be understood to mean an arrangement with respect to a gap length direction, which is substantially perpendicular, in particular perpendicular and/or transverse, to the coil winding axis. The term "with respect to the gap width" can be understood to mean an arrangement with respect to a gap width direction, which is substantially perpendicular, in particular perpendicular and/or transverse, to the coil winding axis.

The gap width direction and the gap length direction are aligned substantially perpendicular, in particular perpendicular and/or transverse, to one another. The gap length direction is aligned substantially parallel, in particular parallel, to a gap-forming gap face or to both gap-forming gap faces of the gap. The gap width direction is aligned substantially parallel, in particular parallel, to a transverse face of the gap-forming magnetic-flux guiding elements.

In an advantageous further development of the solution according to the invention, provision is made that each gap has respectively a gap height, a gap width and a gap length, wherein the filling assembly arranged in at least one gap is formed, with respect to the gap length, of different material layers, wherein at least one of these differently formed layers with respect to the gap width is a magnetically neutral layer, in particular an air layer.

In other words, the gap, partly filled with a filling assembly, has in longitudinal direction at least one partial region which is only filled with air. Thus, in this partial region, with respect to the gap height only a continuous air layer is formed.

The invention further relates to an arrangement of magnetic-flux guiding elements for an induction charging device according to the invention. The arrangement has at least two magnetic-flux guiding elements, spaced apart from one another, which are able to be arranged in the housing interior of the induction charging device. At least one gap is formed between the two magnetic-flux guiding elements spaced apart from one another, wherein the gap is filled partly or entirely by a filling assembly having several layers, wherein the magnetic-flux guiding elements spaced apart from one another form, together with the filling assembly, an assembly which is able to be mounted in one piece in the gap.

For this, the filling assembly can form at least one outer layer which is formed partly within the gap and partly outside the gap.

The outer layer can be formed for the distancing and/or for the connecting and/or for the fixing and/or for the positioning of components of the induction charging device within the housing interior. The outer layer can be formed outside the gap for the distancing and/or for the connecting and/or for the fixing and/or for the positioning of components of the induction charging device.

The outer layer can be formed for the distancing and/or for the connecting and/or for the fixing and/or for the positioning of the shielding housing. The outer layer can be formed for the distancing and/or for the connecting and/or for the fixing and/or for the positioning of the protective housing. The outer layer can be formed for the distancing and/or for the connecting and/or for the fixing and/or for the positioning of the coil. The outer layer can be formed for the distancing and/or for the connecting and/or for the fixing and/or for the positioning of the magnetic-flux guiding elements which are spaced by the gap.

A connection can form a materially connected connection. The outer layer can form, for distancing, distancing elements, in particular distancing elements formed outside the gap.

The outer layer can be formed as a substantially magnetically neutral solid body layer. Such an outer layer can be hardened (e.g. thermally) in a process step together with at least one further layer, which has magnetic-field conductor particles.

The outer layer can be used outside the gap for connection functions for the wire or respectively coil, components of a power electronics and/or the electromagnetic shield. In addition, a materially connected mechanical connection can provide an additional stability and strength of the overall structure through the filling assembly between a gap face of a magnetic-flux guiding element and a gap face of an adjacent magnetic-flux guiding element spaced by the gap.

Provision can be made that a form fit is formed, in particular a form fit through the outer layer between the magnetic-flux guiding elements, in order to form the magnetic-flux guiding elements, spaced by the gap, to a stable one-piece magnetic-filed conductor arrangement with gap filling and formed-on spacers.

For a form fit, at least one outer layer of the filling assembly can contact and/or touch transverse faces, facing the coil, of both magnetic field conductors, spaced by the gap, and/or transverse faces, facing away from the coil, of both magnetic-flux guiding elements, spaced by the gap, and/or can be connected to these in a materially connected manner.

Provision can be made that a form fit is formed, in particular a form fit through the outer layer between the magnetic field conductors, in order to form an assembly which is able to be mounted in one piece.

The invention further relates to a vehicle charging system with a stationary induction charging station, which is formed at least partly by an induction charging device according to the invention, and/or with a mobile induction device, able to be attached to a vehicle, which is formed at least partly by an induction charging device according to the invention.

For this, the stationary induction charging station can be connected to a stationary energy source. The stationary induction charging station can be buried for example in the ground which is driven on. The stationary induction charging station can form a primary coil, while the mobile induction charging device of the vehicle can form a secondary coil.

The primary coil of the stationary induction charging station can generate a chronologically varying magnetic field, in order to enable a wireless energy transmission with the predetermined transmission power. For this, the primary coil can be supplied with the required electrical energy via a stationary energy source. The secondary coil of the mobile induction charging device can be configured so that an electrical alternating voltage is induced in it, if it is situated in the effective range of the chronologically varying magnetic field of the primary coil of the stationary induction charging station. When the secondary coil is situated in a closed electric circuit, the alternating voltage generates a current flux (alternating current), which can be used e.g. for charging a traction battery unit of the vehicle.

The invention can further relate to a vehicle for a vehicle charging system according to the invention with a mobile induction charging device according to the invention and with a traction battery unit, which is electrically coupled with the mobile induction charging device and is able to be supplied with electrical energy via the latter. The vehicle can be an electrically driven vehicle with at least one rotating electric machine, wherein the rotating electric machine provides for the drive of the vehicle and is supplied here with electrical energy via the traction battery unit. The vehicle can be a road vehicle, in particular a trackless road vehicle. The vehicle can be an electric vehicle, a hybrid vehicle or a plug-in hybrid vehicle.

The induction charging device can be arranged in the vehicle in the vicinity of ground which is driven on.

The invention further relates to a method for manufacturing an induction charging device according to the invention in which, before an inserting of the magnetic-flux guiding elements which are spaced apart from one another into the housing interior, the at least one gap is filled with the filling assembly, wherein the magnetic-flux guiding elements, spaced apart from one another, together with the filling assembly form in the gap an assembly which is able to be mounted in one piece, which is inserted into the housing interior.

An upstream injection moulding or extrusion of the filling assembly with subsequent hardening of the filling assembly can be provided, in order to form a one-piece magnetic-flux guiding unit. Through the hardening, a certain adhesive strength between the filling assembly and the magnetic-flux guiding elements can be achieved, which permits an easy handling of the one-piece magnetic-flux guiding unit in a serial manufacturing process. The handling can be improved by supporting auxiliaries. In addition, the mechanical connection of adjacent magnetic-flux guiding elements can be distinctly increased through targeted introduction of form-fitting contours (e.g. tongue-groove) and thus the manageability can be further improved.

The invention further relates to a method for manufacturing an induction charging device according to the invention, in which the coil is cast in the housing interior with casting compound, in which the magnetic-flux guiding elements are arranged in an installation position with respect to the coil and, for this, are pressed at least partly into the casting compound, wherein the casting compound has an additional volume, so that on pressing in of the magnetic-flux guiding elements into the casting compound, at least a portion of the casting compound at least partly penetrates at least into a gap formed by two spaced magnetic-flux guiding elements, wherein after the arranging of the magnetic-flux guiding elements in the installation position at least one further layer of the filling assembly is introduced into the gap.

Provision can be made that the coil is cast in the protective housing with magnetically neutral casting compound without magnetic-flux guiding particles. The casting compound can have good thermal conductivity characteristics. The casting compound can have a thermal conductivity and/or a thermal conductivity coefficient of at least 0.5 W/(m·K), in particular of at least 1.0 W/(m·K) or in particular of at least 10.0 W/(m·K).

The casting compound can form a substantially magnetically neutral casting compound.

The casting compound, in particular the magnetically neutral casting compound, on pressing in of the magnetic-flux guiding elements into the casting compound, can penetrate at least into one gap or several gaps or all gaps up to ca. 5 to 20% of the gap height or respectively can fill the latter. Subsequently, one layer or several layers with magnetic-flux guiding particles can be introduced into at least one gap or several gaps or all gaps. This layer or layers with magnetic-flux guiding particles can fill at least one gap or several gaps or all gaps with a gap filling of ca. 50 to 90% of the gap height. This layer or layers can be introduced by dispensing into the gap. This layer or layers can be introduced as adhesive layer and/or injection-moulded layer and/or porous solid body layer into at least one gap or several gaps or all gaps. The remaining gap space can be filled by casting compound, in particular the magnetically neutral casting compound. Furthermore, the transverse faces, facing away from the coil, of the magnetic field conductors can be covered and/or wetted with the casting compound entirely or partly, in particular in the manner of a grid pattern. Here also the gap courses can be covered and/or wetted. Subsequently, the shielding housing, in particular in the form of a metallic shielding sheet, can be placed or laid onto the casting compound, in particular the dispensed pattern. Subsequently, the shielding housing can be pressed into the casting compound up to the target distance with respect to the coil winding axis to the magnetic-flux guiding elements. Subsequently, the device and/or casting compound and/or filling assembly can harden, in particular harden thermally.

The invention further relates to a method for manufacturing an induction charging device according to the invention, in which a filling assembly is introduced into a gap and subsequently, in particular through a hydraulic and/or pneumatic pressure, is compressed in the gap. For this, the structure of magnetic-flux guiding elements, in particular ferrite tiles, and the filling assembly can be positioned between two rubber bellows, in which the pressure required for the compressing can be set. The elastic rubber material adapts to the gap contour and compresses the filling assembly in the gap. The filling height of the filling assembly in the gap can reduce here. Such a method can also be applied with a paper-encased fill.

Fills, in particular compressed fills, of magnetic-flux guiding particles can be formed by methods of shaping of ferrite powder, which are also used in the production (shaping) of green bodies in a sinter process.

For the compression of magnetic-flux guiding particles in the gap, a pressure in the pressure range of 1 MPa (e.g. loose compression) to 100 MPa (e.g. a readily manageable, independent green body) can be used. Preferably, for the compression of magnetic-flux guiding particles in the gap, a pressure in the pressure range of 10 to 20 MPa can be used, which is able to be managed easily and economically with regard to manufacturing technique and technologically.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
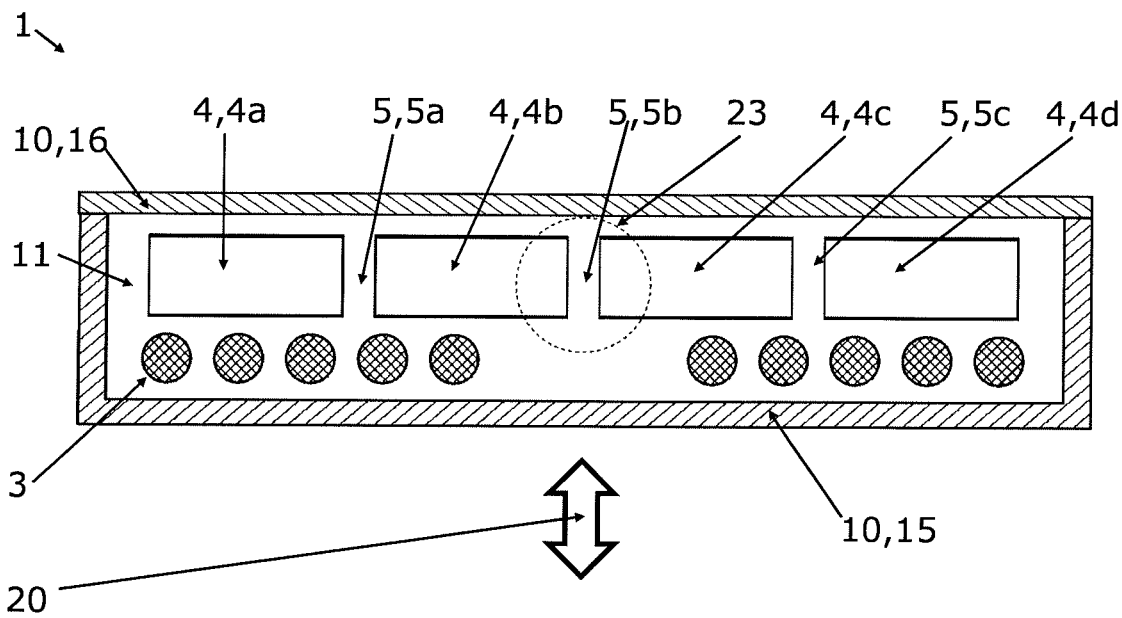
FIG. 1 a sectional view through an induction charging device.
Figure 10:
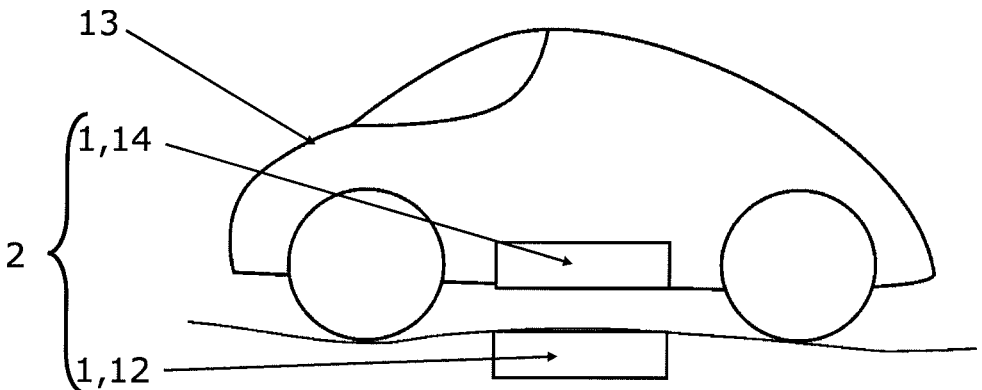

FIG. 1 shows an induction charging device 1 for a vehicle charging system 2, which is illustrated in FIG. 10.

The induction charging device 1 can have a housing 10, which is formed by a protective housing 15 and by a shielding housing 16. The housing 10 can form a housing interior 11 for receiving components of the induction charging device 1. The protective housing 15 can form a trough-shaped protective housing 15. The protective housing 15 can be formed from an electrically non-conductive material. The shielding housing 16 can form a shielding body for electromagnetic shielding.

In the housing interior 11 at least one coil 3 is arranged, which is formed for generating or receiving an electromagnetic alternating field. The coil 3 can be formed as a flat coil, which can be wound substantially around a coil winding axis 20.

The induction charging device 1 has several magnetic-flux guiding elements 4, spaced from one another, in particular 4a, 4b, 4c and 4d, which are arranged in the housing interior 11. Between the two magnetic-flux guiding elements 4, 4a and 4, 4b, spaced apart from one another transversely to the coil winding axis 20, a gap 5, 5a is formed. Between the two magnetic-flux guiding elements 4, 4b and 4, 4c, spaced apart from one another transversely to the coil winding axis 20, a gap 5, 5b is formed. Between the two magnetic-flux guiding elements 4, 4c and 4, 4d, spaced apart from one another transversely to the coil winding axis 20, a gap 5, 5c is formed.

Figure 2:
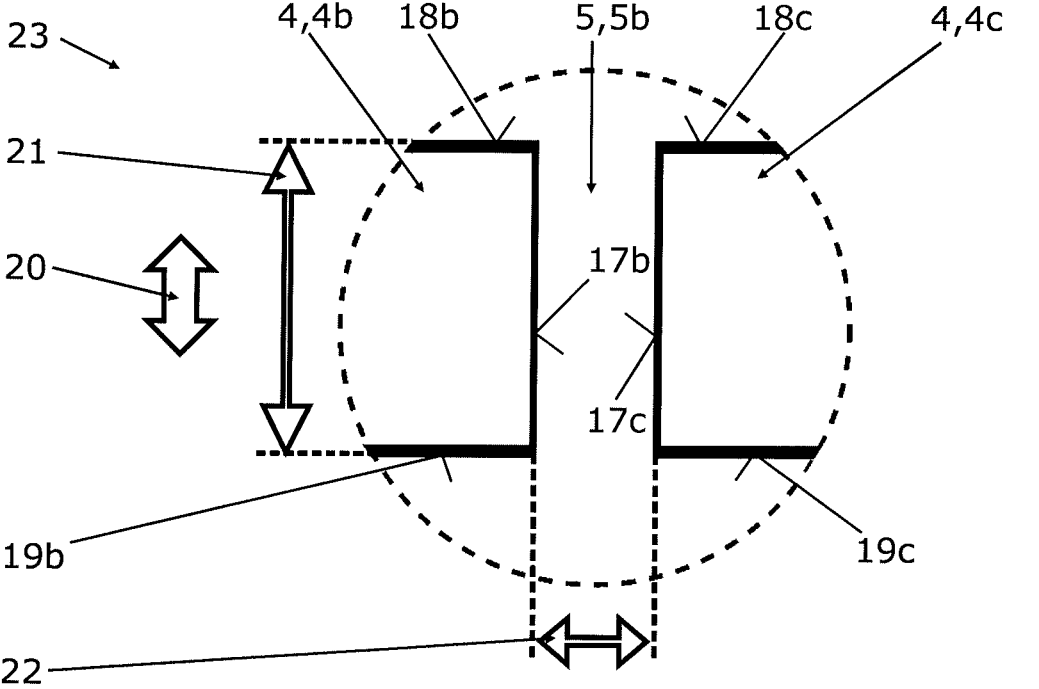
FIG. 2 an enlarged cutout of FIG. 1.

FIG. 2 shows a cutout 23 of FIG. 1 in an enlarged representation. In FIG. 2, by way of example the gap 5, 5b is explained, wherein this description also applies in an analogous manner to the other gaps 5, 5a and 5, 5c.

The gap 5, 5*b* has a gap height 21 and a gap width 22. The gap height 21 is formed and/or aligned substantially parallel to the coil winding axis 20. The gap width 22 is formed and/or aligned substantially transversely and/or perpendicularly to the coil winding axis 20.

The gap width 22 corresponds substantially to a distance transverse and/or perpendicular to the coil winding axis 20 between a gap face 17*b* of the magnetic-flux guiding element 4, 4*b* and a gap face 17*c* further of the magnetic-flux guiding element 4, 4*c* spaced by the gap 5, 5*b*. The gap face 17*b* and 17*c* are aligned substantially parallel to the coil winding axis 20.

The gap height 21 corresponds to a thickness of the magnetic-flux guiding element 4, 4*b* and/or 4, 4*c* with respect to the coil winding axis 20. The gap height 21 can correspond to the distance between a transverse face 18*b* of the magnetic-flux guiding element 4, 4*b*, faced facing away from the coil, and a coil-facing transverse face 19*b* of the magnetic-flux guiding element 4, 4*b* with respect to the coil winding axis 20. The gap height 21 can correspond to the distance between a transverse face 18*c* of the magnetic-flux guiding element 4, 4*c* facing away from the coil and a coil-facing transverse face 19*c* of the magnetic-flux guiding element 4, 4*c* with respect to the coil winding axis 20.

The coil-facing transverse faces 19*b* and/or 19*c* can be aligned substantially transversely and/or perpendicularly to the coil winding axis 20. The transverse faces 18*b* and/or 18*c*, facing away from the coil, can be aligned substantially transversely and/or perpendicularly to the coil winding axis 20.

The coil-facing transverse faces 19*b* and 19*c* of several magnetic-flux guiding elements 4, 4*a* and 4, 4*b* can lie and/or be aligned substantially in a shared coil-facing plane. The transverse faces 18*b* and 18*c* of several magnetic-flux guiding elements 4, 4*a* and 4, 4*b*, facing away from the coil, can lie and/or be aligned substantially in a shared plane facing away from the coil. The shared coil-facing plane and the shared plane facing away from the coil can be arranged spaced apart from one another with respect to the coil winding axis 20. The shared coil-facing plane and the shared plane, facing away from the coil, can be aligned substantially parallel to one another.

Several or all magnetic field conductors 4, in particular 4*a*, 4*b*, 4*c* and/or 4*d*, can have a substantially identical thickness. Several or all magnetic field conductors 4, in particular 4*a*, 4*b*, 4*c* and/or 4*d* can be configured similarly.

In each of the gaps 5, in particular 5*a*, 5*b* and 5*c*, respectively a filling assembly 6, in particular 6*a*, 6*b* and 6*c*, is at least partly arranged. For the sake of clarity, the filling assemblies 6, in particular 6*a*, 6*b* and 6*c*, are not illustrated in FIG. 1 and FIG. 2, but rather in FIG. 3 to FIG. 9. The structure of the induction charging device 1 in FIG. 3 to FIG. 9 differs compared to FIG. 1 only in the configuration of the filling assemblies 6, in particular 6*a*, 6*b* and 6*c*, so that for the different components from the filling assemblies 6, in particular 6*a*, 6*b* and 6*c*, reference is made to the description concerning FIG. 1.

Figure 3:
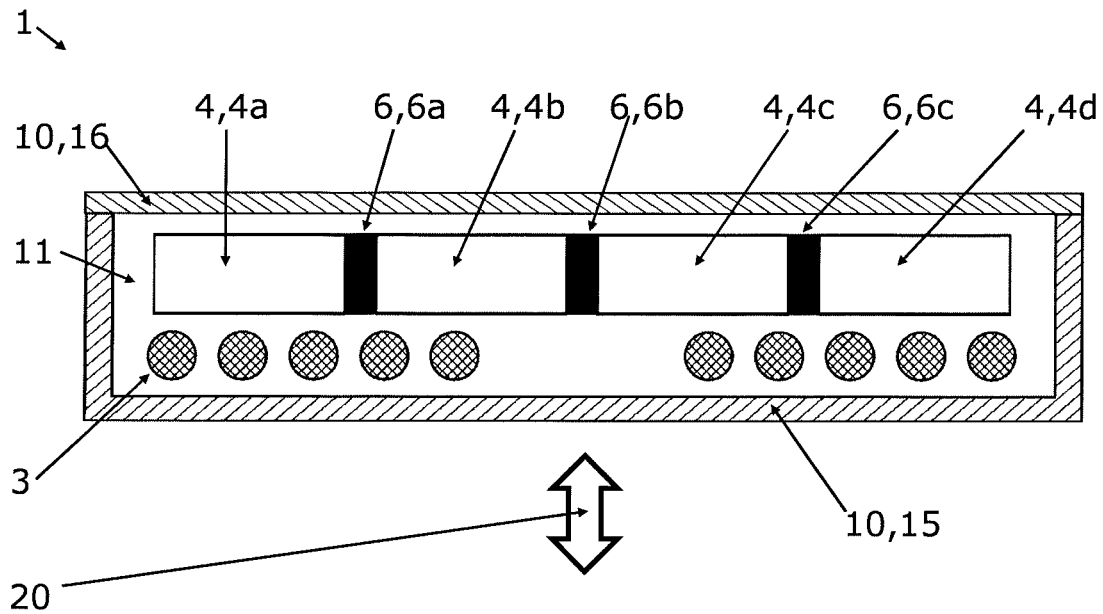
FIG. 3 a sectional view through an induction charging device according to the invention, FIG. 4 a sectional view through a further induction charging device according to the invention, FIG. 5 a sectional view through a further induction charging device according to the invention, FIG. 6 a sectional view through a further induction charging device according to the invention, FIG. 7 a sectional view through a further induction charging device according to the invention, FIG. 8 a sectional view through a further induction charging device according to the invention, FIG. 9 an enlarged cutout of a filled gap with magnetic-flux guiding particles, FIG. 10 a vehicle charging system, FIG. 11 a vehicle for a vehicle charging system, FIG. 12 a top view onto a gap between two magnetic-flux guiding elements.

In FIG. 3 the gaps 5, in particular 5*a*, 5*b* and 5*c*, are filled substantially entirely by the filling assemblies 6, in particular 6*a*, 6*b* and 6*c*. The filling assemblies 6, in particular 6*a*, 6*b* and 6*c* can form layers 8 which are not illustrated.

Provision can be made for example that one or more or all layers are formed as a fill, in particular as a loose fill or compressed fill, of magnetic-flux guiding particles. Through the gravitational force and/or through a compression, layers which are not illustrated can form, in which the number of magnetic-field conductor particles or respectively the density of the magnetic field conductor particles varies with respect to the coil winding axis 20.

In FIG. 4 to FIG. 9 respectively by way of example the filling assembly 6, 6*b* is explained, wherein this description also applies in an analogous manner for the other filling assemblies 6, 6*a* and 6, 6*c*.

Figure 4:
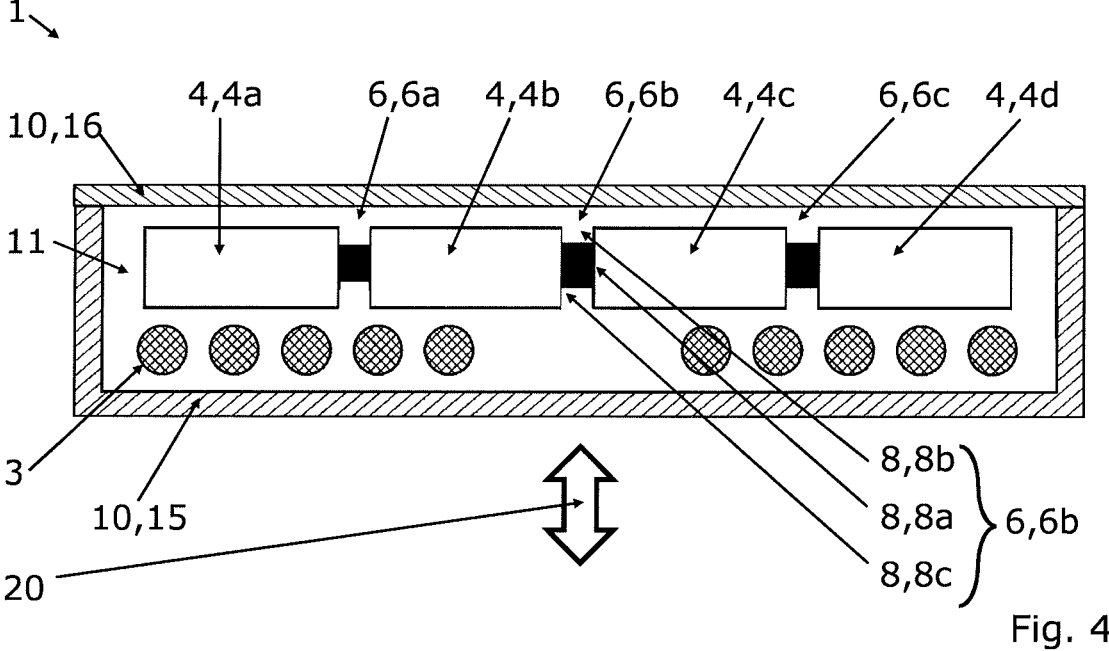

In FIG. 4 the filling assemblies 6, 6*b* have several layers 8. The layer 8, 8*a* here is a magnetically conductive layer, which has e.g. magnetic-flux guiding particles. The layers 8, 8*b* and 8, 8*c* are formed as air layers. The layer 8, 8*a* can be formed by several layers which are not illustrated.

Figure 5:
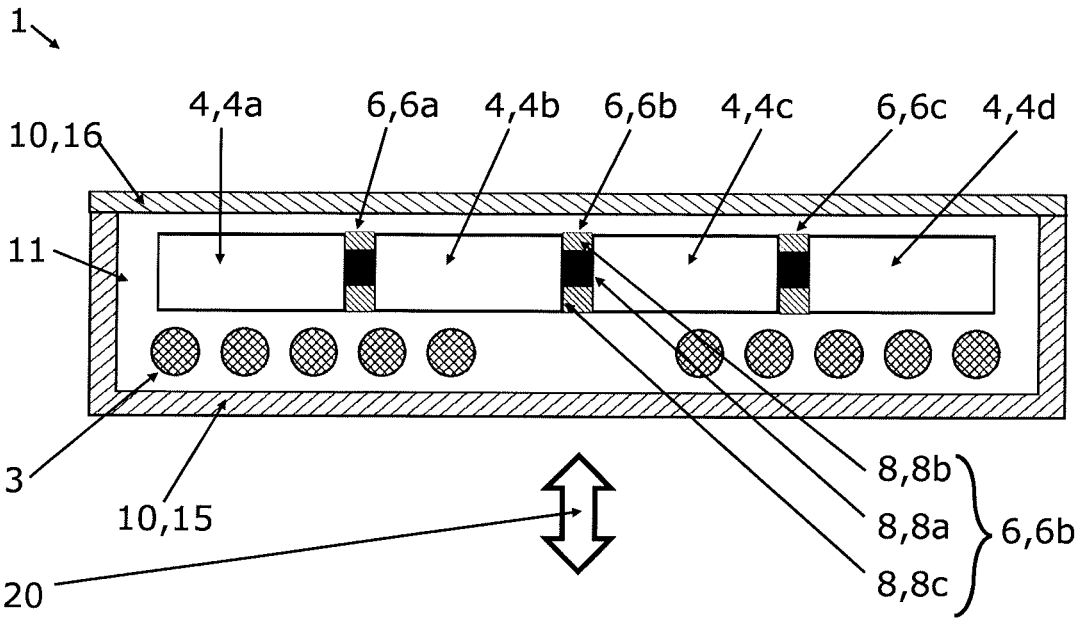

In FIG. 5 the filling assemblies 6, 6*b* have several layers 8. The layer 8, 8*a* here is a magnetically conductive layer, which has e.g. magnetic-flux guiding particles. The layers 8, 8*b* and 8, 8*c* are formed as magnetically neutral solid body layers. The layer 8, 8*a* can be formed by several layers which are not illustrated.

Figure 6:
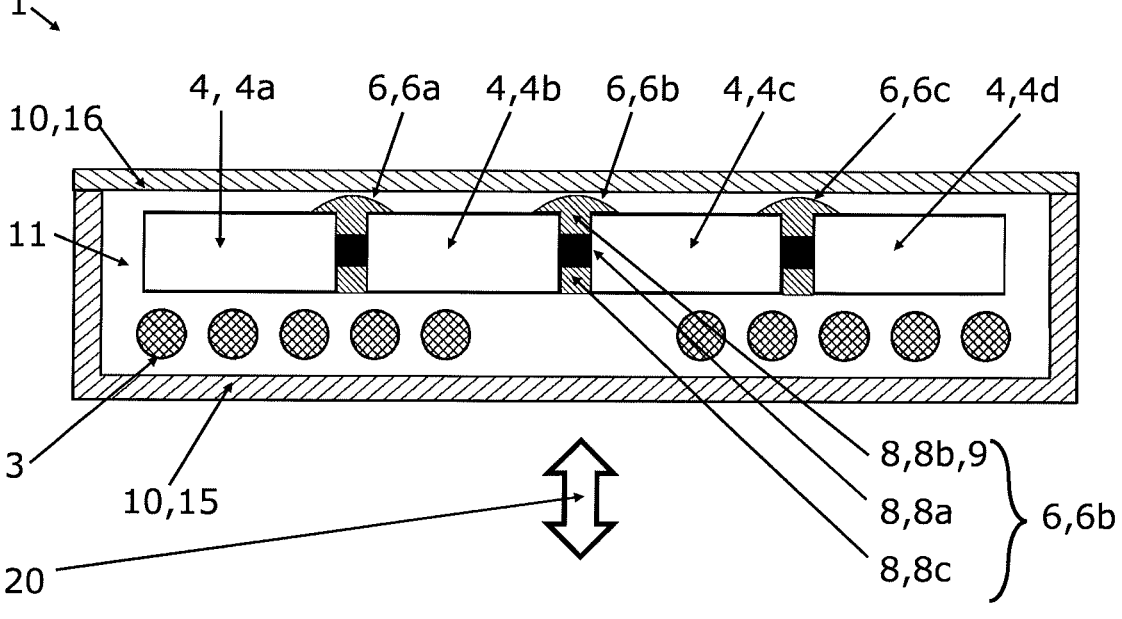

In FIG. 6 the filling assemblies 6, 6*b* have several layers 8. The layer 8, 8*a* here is a magnetically conductive layer, which has e.g. magnetic-flux guiding particles. The layers 8, 8*b* and 8, 8*c* are formed as magnetically neutral solid body layers. The layer 8, 8*b* is additionally formed as outer layer 9. The outer layer 9 forms integrally a spacer element for spacing the shielding housing 16 with respect to the magnetic-flux guiding elements 4, in particular 4*a*, 4*b*, 4*c* and 4*d*. The layer 8, 8*a* can be formed by several layers which are not illustrated.

Figure 7:
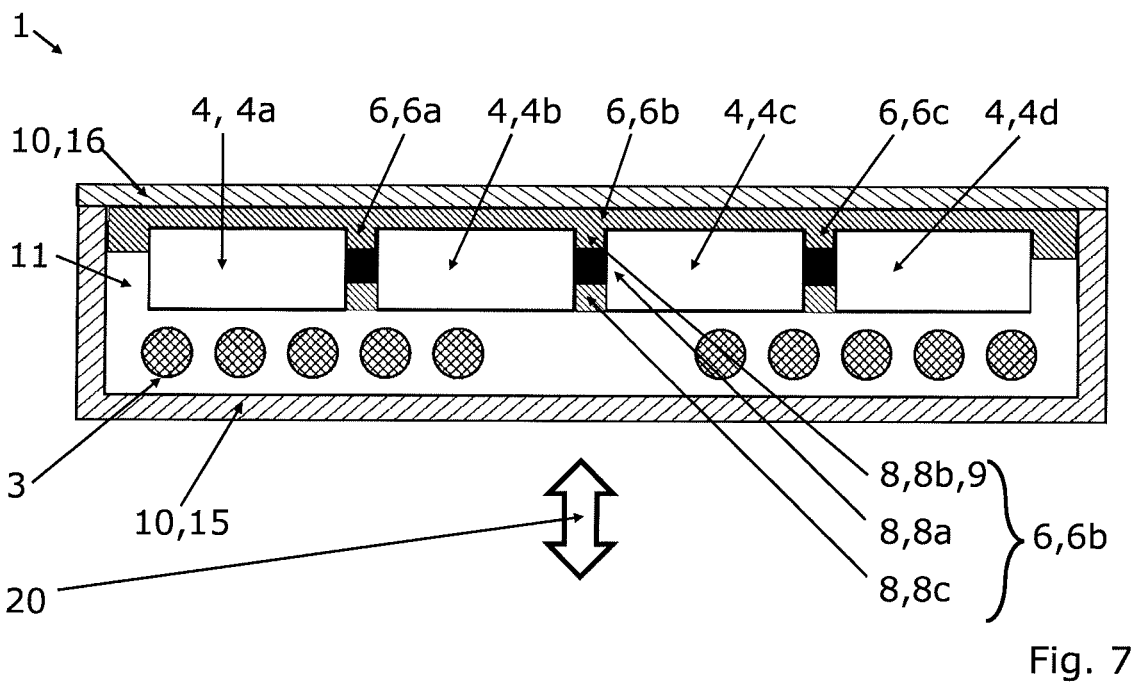

In FIG. 7 the filling assemblies 6, 6*b* have several layers 8. The layer 8, 8*a* here is a magnetically conductive layer, which has e.g. magnetic-flux guiding particles. The layers 8, 8*b* and 8, 8*c* are formed as magnetically neutral solid body layers. The layer 8, 8*b* is additionally formed as outer layer 9. Compared to FIG. 6, the outer layers 9 of the respective filling assemblies 6*a*, 6*b* and 6*c* are directly connected to one another. The outer layers 9 of the respective filling assemblies 6*a*, 6*b* and 6*c* thus form a shared outer layer, which entirely fills the free space between shielding housing 16 and magnetic-flux guiding elements 4, in particular 4*a*, 4*b*, 4*c* and 4*d*. This shared outer layer can be formed for example by a casting compound, in particular a hardened casting compound.

Figure 8:
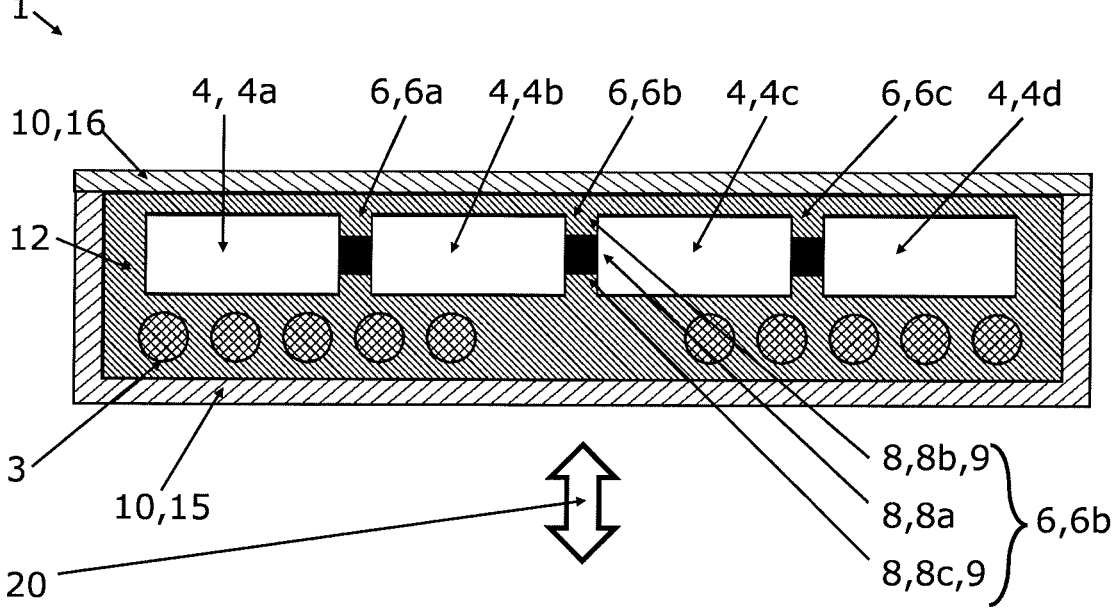

In FIG. 8 the filling assemblies 6, 6*b* have several layers 8. The layer 8, 8*a* here is a magnetically conductive layer, which e.g. has magnetic-flux guiding particles. The layers 8, 8*b* and 8, 8*c* are formed as magnetically neutral solid body layers. The layer 8, 8*b* and the layer 8, 8*c* are additionally formed as outer layers 9. The outer layers 9 of all filling assemblies 6*a*, 6*b* and 6*c* are directly connected to one another. The outer layers 9 of the filling assemblies 6*a*, 6*b* and 6*d* thus form a shared outer layer, which entirely fills the housing interior 11.

For this, the coil 3 can be cast for example with neutral filling material in the protective housing 15, wherein subsequently the magnetic-flux guiding elements 4, in particular 4*a*, 4*b*, 4*c* and 4*d*, are inserted into the casting compound. Magnetic-flux guiding elements 4, in particular 4*a*, 4*b*, 4*c* and 4*d*, can be used as an assembly able to be mounted in one piece, wherein the assembly which is able to be mounted in one piece can have parts or layers 8 of the filling assemblies 6, in particular 6*a*, 6*b* and 6*c*, before the inserting into the casting compound.

The magnetic-flux guiding elements 4, in particular 4*a*, 4*b*, 4*c* and 4*d* can also be inserted separately from one another into the casting compound, wherein subsequently a filling-in of the layers 8 of the respective filling assemblies 6 takes place. The layer 8, 8*b*, 9 can be formed by the introducing of further casting compound to the magnetic-flux guiding elements 4, in particular 4a, 4b, 4c and 4d, in order to entirely fill the free space between shielding housing 16 and magnetic flux-guiding elements 4, in particular 4a, 4b, 4c and 4d.

Figure 9:
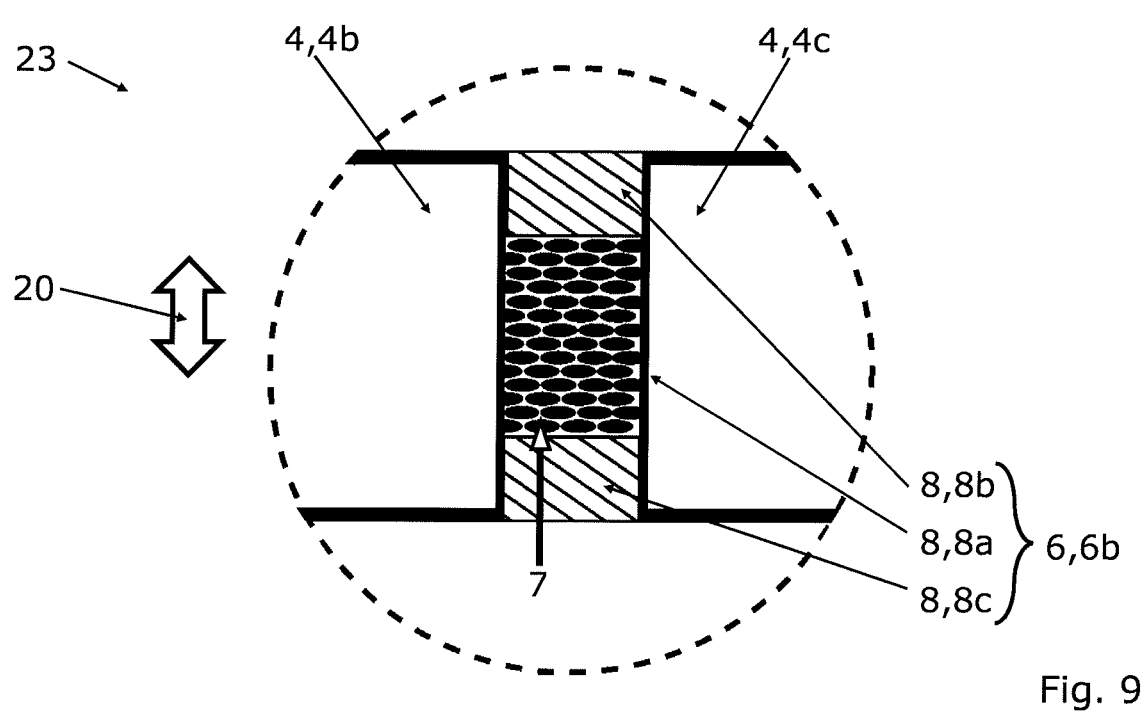

In FIG. 9 the filling assemblies 6, 6b have several layers 8. The layer 8, 8a here is a magnetically conductive layer, which has magnetic-flux guiding particles 7. The layers 8, 8b and 8, 8c are formed as magnetically neutral solid body layers. The magnetic-flux guiding particles 7 of the layer 8, 8a have a particle shape deviating from a spherical shape. These magnetic-flux guiding particles 7 of the layer 8, 8a are aligned in the gap 5, 5b so that they have a smaller extent along a direction parallel to the coil winding axis 20 compared to an extent along a direction transversely and/or perpendicularly to the coil winding axis 20. Hereby, a naturally aligned layer structure on introducing of the magnetic-flux guiding particles 7 can be achieved by trickling, pouring or similar or respectively in the injection method of filled matrix materials or settling behaviour in low-viscosity suspensions.

FIG. 10 shows a vehicle charging system 2 with a stationary induction charging station 12, which is formed at least partly by an induction charging device 1 according to the invention. The vehicle charging system 2 further comprises a mobile induction device 14, able to be attached to a vehicle 13, which is formed at least partly by an induction charging device 1 according to the invention.

Figure 11:
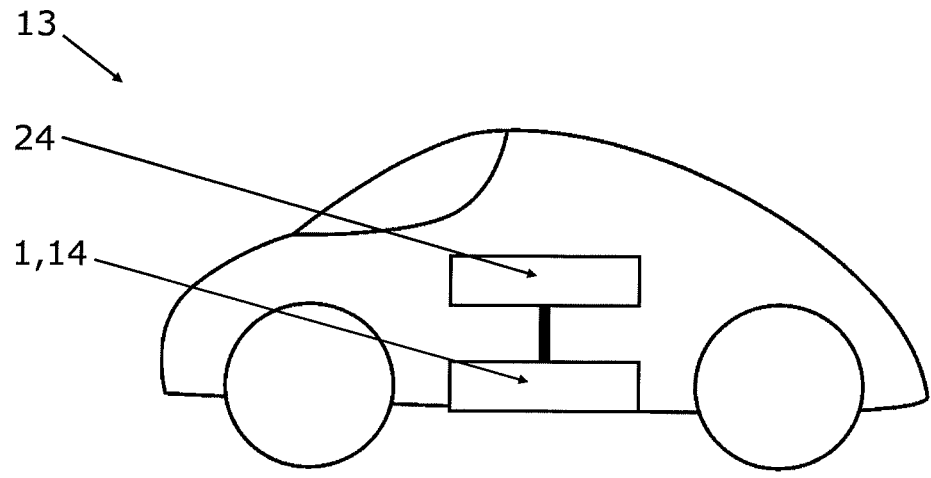

FIG. 11 shows a vehicle 13 for a vehicle charging system 2 with a mobile induction charging device 14 and with a traction battery unit 24, which is electrically coupled with the mobile induction charging device 14 and is able to be supplied via the latter with electrical energy.

Figure 12:
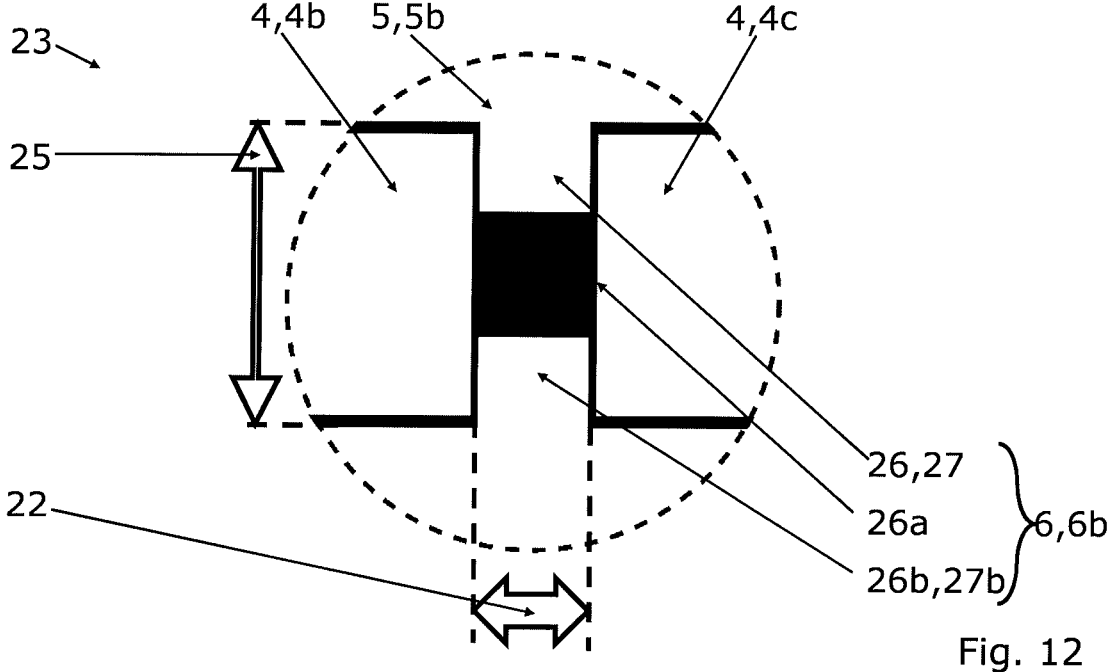

FIG. 12 shows a top view onto a gap 5, 5b wherein in this view by way of example a gap width 22 and a gap length 25 of the gap 5, 5b are able to be seen. In this illustration, the coil winding axis 20 is aligned perpendicularly to the plane of the drawing. The filling assembly 6, 6b arranged in the gap 5, 5b is formed with respect to the gap length 25 of different material layers 26, 26a and 26b, wherein the layers 26 and 26b form magnetically neutral layers 27 and 27b, in particular respectively an air layer. The material layer 26a is at least partly or entirely magnetically conductive. The material layer 26a can be formed with respect to the gap height 21, which is not illustrated, of different layers 8.

The invention claimed is:

1. An induction charging device for a vehicle charging system, comprising:
   at least one coil for generating or receiving a magnetic alternating field,
   at least two magnetic-flux guiding elements spaced apart from one another,
   at least one gap disposed between the at least two magnetic-flux guiding elements, spaced apart from one another,
   a filling assembly at least partially arranged in the at least one gap,
   wherein the filling assembly is at least partly magnetically conductive,
   wherein the filling assembly includes a plurality of layers,
   at least one of the plurality of layers of the filling assembly defines a magnetically conductive layer and at least one other of the plurality of layers of the filling assembly defines a magnetically neutral layer,
   the at least one gap has a gap height corresponding to a thickness of the at least two magnetic-flux guiding elements, a gap width corresponding to a distance between adjacent faces of the at least two magnetic-flux guiding elements, and a gap length extending in a direction transversely to the gap height and the gap length, and
   the filling assembly, arranged in the at least one gap, is defined of different layers including the magnetically conductive layer and the magnetically neutral layer with respect to at least one of the gap height and the gap length.

2. The induction charging device according to claim 1, wherein the magnetically conductive layer of the filling assembly has magnetic-flux guiding particles; and
   wherein at least one of:
   at least a portion of the magnetic-flux guiding particles define respectively a particle shape deviating from a spherical shape,
   at least a portion of the magnetic-flux guiding particles define respectively a particle shape in the form of a spheroid,
   at least a portion of the magnetic-flux guiding particles define respectively a particle shape in the form of a triaxial ellipsoid, and
   at least a portion of the magnetic-flux guiding particles define respectively a flat particle shape.

3. The induction charging device according to claim 2, wherein at least one of:
   at least a portion of the magnetic-flux guiding particles is introduced as fill into the at least one gap,
   at least a portion of the magnetic-flux guiding particles is introduced as loose fill into the at least one gap,
   at least a portion of the magnetic-flux guiding particles is introduced as compressed fill into the at least one gap.

4. The induction charging device according to claim 3, wherein at least one of:
   the fill is arranged with a separate positional securing in the at least one gap, wherein the separate positional securing is arranged in the at least one gap free of material connection with respect to the at least two magnetic-flux guiding elements, and
   the fill is arranged with an integral positional securing in the at least one gap, wherein the integral positional securing is connected at least partly in a materially connected manner with the at least two magnetic-flux guiding elements.

5. The induction charging device according to claim 4, wherein:
   the separate positional securing has a casing body for an entire encasing of the magnetic- flux guiding particles of the fill, and
   the casing body provides a package together with the magnetic-flux guiding particles of the fill.

6. The induction charging device according to claim 4, wherein:
   the fill that is arranged with the integral positional securing in the at least one gap defines a porous solid body layer, and
   the porous solid body layer is defined by the magnetic-flux guiding particles that have a surface coating for materially connected connection with one another and for at least partial materially connected connection with the at least two magnetic-flux guiding elements.

7. The induction charging device according to claim 2, wherein:
   the magnetically conductive layer of the filling assembly has at least one embedding matrix for an embedding of magnetic-flux guiding particles, and/or at least a portion of the magnetic-flux guiding particles is introduced as filler in at least one embedding matrix of the filling assembly, and/or the at least one embedding matrix with magnetic-flux guiding particles embedded therein is introduced in pasty form into the at least one gap, or the at least one embedding matrix with magnetic-flux guiding particles embedded therein is introduced in pasty form into the at least one gap, wherein the at least one embedding matrix is provided from an actively hardenable matrix material, or the at least one embedding matrix with magnetic-flux guiding particles embedded therein is introduced in pasty form into the at least one gap, wherein the at least one embedding matrix is provided from a passively hardenable matrix material.

8. The induction charging device according to claim 1, wherein at least one of:

the at least one magnetically conductive layer of the filling assembly is arranged between two magnetically neutral layers of the filling assembly, and the at least one magnetically conductive layer of the filling assembly is arranged touching on at least one magnetically neutral layer of the filling assembly.

9. The induction charging device according to claim 1, wherein at least one of:

at least one magnetically neutral layer of the filling assembly is an air layer, at least one magnetically neutral layer of the filling assembly forms through a magnetically neutral solid body layer, and at least one magnetically neutral solid body layer of the filling assembly defines a magnetically neutral outer layer that is provided partly within the at least one gap and partly outside the at least one gap.

10. The induction charging device according to claim 9, wherein at least one of:

the at least one magnetically neutral solid body layer of the filling assembly is defined by a magnetically neutral casting compound, the magnetically neutral outer layer is provided for at least one of the distancing, connecting, fixing, and positioning of components, and the at least two magnetic-flux guiding elements, spaced apart from one another, provide together with the filling assembly in the at least one gap an assembly that is able to be mounted in one piece.

11. The induction charging device according to claim 1, wherein:

at least two gaps, spaced apart from one another, are provided, in which respectively a filling assembly with at least one magnetically neutral layer is arranged, and the magnetically neutral layers are connected to one another.

12. The induction charging device according to claim 1, wherein at least one of:

at least one layer of the filling assembly has magnetic-flux guiding particles, wherein within this layer a concentration of the magnetic-flux guiding particles varies spatially, and at least two layers of the filling assembly have respectively magnetic-flux guiding particles, wherein a concentration of the magnetic-flux guiding particles is different in the at least two layers.

13. The induction charging device according to claim 1, wherein:

the at least two magnetic-flux guiding elements includes further magnetic-flux guiding elements spaced apart from one another, wherein between the magnetic-flux guiding elements spaced apart from one another, several gaps are disposed, and wherein only in a portion of the gaps respectively the filling assembly is at least partly arranged.

14. The induction charging device according to claim 1, wherein the magnetically neutral layer is a magnetically neutral solid body layer formed as an outer layer that projects out of the at least one gap in a gap height direction for at least one of the distancing, connecting, fixing, and positioning of components.

15. An arrangement of magnetic-flux guiding elements for an induction charging device, comprising:

at least two magnetic-flux guiding elements spaced apart from one another, at least one gap disposed between the at least two magnetic-flux guiding elements that are spaced apart from one another, wherein the at least one gap is filled partly or entirely by a filling assembly with a plurality of layers, wherein the at least two magnetic-flux guiding elements, spaced apart from one another, provide together with the filling assembly in the at least one gap an assembly that is able to be mounted in one piece, wherein at least one layer of the filling assembly defines a magnetically conductive layer and at least one other layer of the filling assembly defines a magnetically neutral layer, wherein the at least one gap has a gap height corresponding to a thickness of the at least two magnetic-flux guiding elements, a gap width corresponding to a distance between adjacent faces of the at least two magnetic-flux guiding elements, and a gap length extending in a direction transversely to the gap height and the gap length, and wherein the filling assembly, arranged in the at least one gap, is defined of different layers with respect to at least one of the gap height and the gap length including the magnetically conductive layer and the magnetically neutral layer.

16. The arrangement according to claim 15, wherein the magnetically conductive layer of the filling assembly has magnetic-flux guiding particles.

17. The arrangement according to claim 16, wherein:

the magnetically conductive layer is arranged between two magnetically neutral layers of the filling assembly, and the magnetic-flux guiding particles of the magnetically conductive layer are provided as a loose fill comprising the magnetic-flux guiding particles and air.

18. A vehicle charging system, comprising:

a stationary induction charging station that is defined at least partly by an induction charging device, and/or a mobile induction charging device, able to be attached to a vehicle, that is defined at least partly by the induction charging device, wherein the induction charging device includes:

at least one coil for generating or receiving a magnetic alternating field, at least two magnetic-flux guiding elements spaced apart from one another, at least one gap disposed between the at least two magnetic-flux guiding elements, a filling assembly at least partially arranged in the at least one gap, wherein the filling assembly is at least partly magnetically conductive, wherein the filling assembly includes a plurality of layers, the plurality of layers of the filling assembly including at least one layer that defines a magnetically conductive layer and at least one other layer that defines a magnetically neutral layer, wherein the at least one gap has a gap height corresponding to a thickness of the at least two magnetic-flux guiding elements, a gap width corresponding to a distance between adjacent faces of the at least two magnetic-flux guiding elements, and a gap length extending in a direction transversely to the gap height and the gap length, wherein the filling assembly, arranged in the at least one gap, is defined of different layers including the magnetically conductive layer and the magnetically neutral layer with respect to at least one of the gap height and the gap length; and wherein the magnetically conductive layer of the filling assembly is defined by magnetic-flux guiding particles.

19. The vehicle charging station according to claim 18, wherein at least one of:

at least a portion of the magnetic-flux guiding particles define respectively a particle shape deviating from a spherical shape, at least a portion of the magnetic-flux guiding particles define respectively a particle shape in the form of a spheroid, at least a portion of the magnetic-flux guiding particles define respectively a particle shape in the form of a triaxial ellipsoid, and at least a portion of the magnetic-flux guiding particles define respectively a a lenticular or plate-like shape.

20. The vehicle charging station according to claim 18, wherein the magnetically neutral layer is a magnetically neutral solid body layer formed as an outer layer that projects out of the at least one gap in a gap height direction for at least one of the distancing, connecting, fixing, and positioning of components.

* * * * *